US010389436B2

(12) United States Patent
Hyakudai et al.

(10) Patent No.: US 10,389,436 B2
(45) Date of Patent: Aug. 20, 2019

(54) COMMUNICATION DEVICE, COMMUNICATION SYSTEM, AND COMMUNICATION METHOD

(71) Applicant: Sony Corporation, Tokyo (JP)

(72) Inventors: Toshihisa Hyakudai, Kanagawa (JP); Masanari Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 91 days.

(21) Appl. No.: 15/545,610

(22) PCT Filed: Apr. 6, 2016

(86) PCT No.: PCT/JP2016/001927
§ 371 (c)(1),
(2) Date: Jul. 21, 2017

(87) PCT Pub. No.: WO2016/170746
PCT Pub. Date: Oct. 27, 2016

(65) Prior Publication Data
US 2018/0006716 A1    Jan. 4, 2018

(30) Foreign Application Priority Data

Apr. 20, 2015  (JP) .................. 2015-085525

(51) Int. Cl.
H04B 10/077    (2013.01)
H04B 10/07     (2013.01)
H04B 10/079    (2013.01)
H04B 10/25     (2013.01)

(52) U.S. Cl.
CPC ......... H04B 10/0771 (2013.01); H04B 10/07 (2013.01); H04B 10/0775 (2013.01); H04B 10/0791 (2013.01); H04B 10/2504 (2013.01)

(58) Field of Classification Search
CPC ................... H04B 10/0771; H04B 10/07; H04B 10/0775; H04B 10/0791; H04B 10/2504
USPC .......................................... 398/32
See application file for complete search history.

(56) References Cited

U.S. PATENT DOCUMENTS 6,583,909 B1 * 6/2003 Wada ................ H04B 10/2931
                                                    359/337.13
2004/0209635 A1 * 10/2004 Hsu ....................... H04W 52/20
                                                    455/522
2010/0008662 A1 * 1/2010 Bradbeer .......... H04B 10/07955
                                                    398/25
2010/0150573 A1 * 6/2010 Furuyama ............ G02B 6/3895
                                                    398/142

(Continued)

FOREIGN PATENT DOCUMENTS

EP    0 944 191 A1    9/1999
JP    09-508249       8/1997
JP    11-266200       9/1999

(Continued)

Primary Examiner — Dalzid E Singh
(74) Attorney, Agent, or Firm — Michael Best & Friedrich LLP

(57) ABSTRACT

There are provided a communication device, a communication system, and a communication method. A communication device includes a first receiver configured to receive a data signal and generate a level control signal based on an initial level of the data signal and on an error rate of the data signal; and a transmitter configured to transmit the level control signal.

18 Claims, 10 Drawing Sheets

(56) References Cited

U.S. PATENT DOCUMENTS

2016/0080843 A1* 3/2016 Charbonneau-Lefort ............... H04Q 11/0071 398/45

FOREIGN PATENT DOCUMENTS

| | | |
|---|---|---|
| JP | 2002-164846 A | 6/2002 |
| JP | 2002-223204 A | 9/2002 |
| JP | 2004-032476 A | 1/2004 |
| JP | 2008-146457 A | 6/2008 |
| JP | 2010-154375 A | 7/2010 |
| JP | 2013-110667 A | 6/2013 |
| JP | 2013-179695 A | 9/2013 |
| WO | WO-95/28777 A | 10/1995 |

* cited by examiner

[FIG. 1]
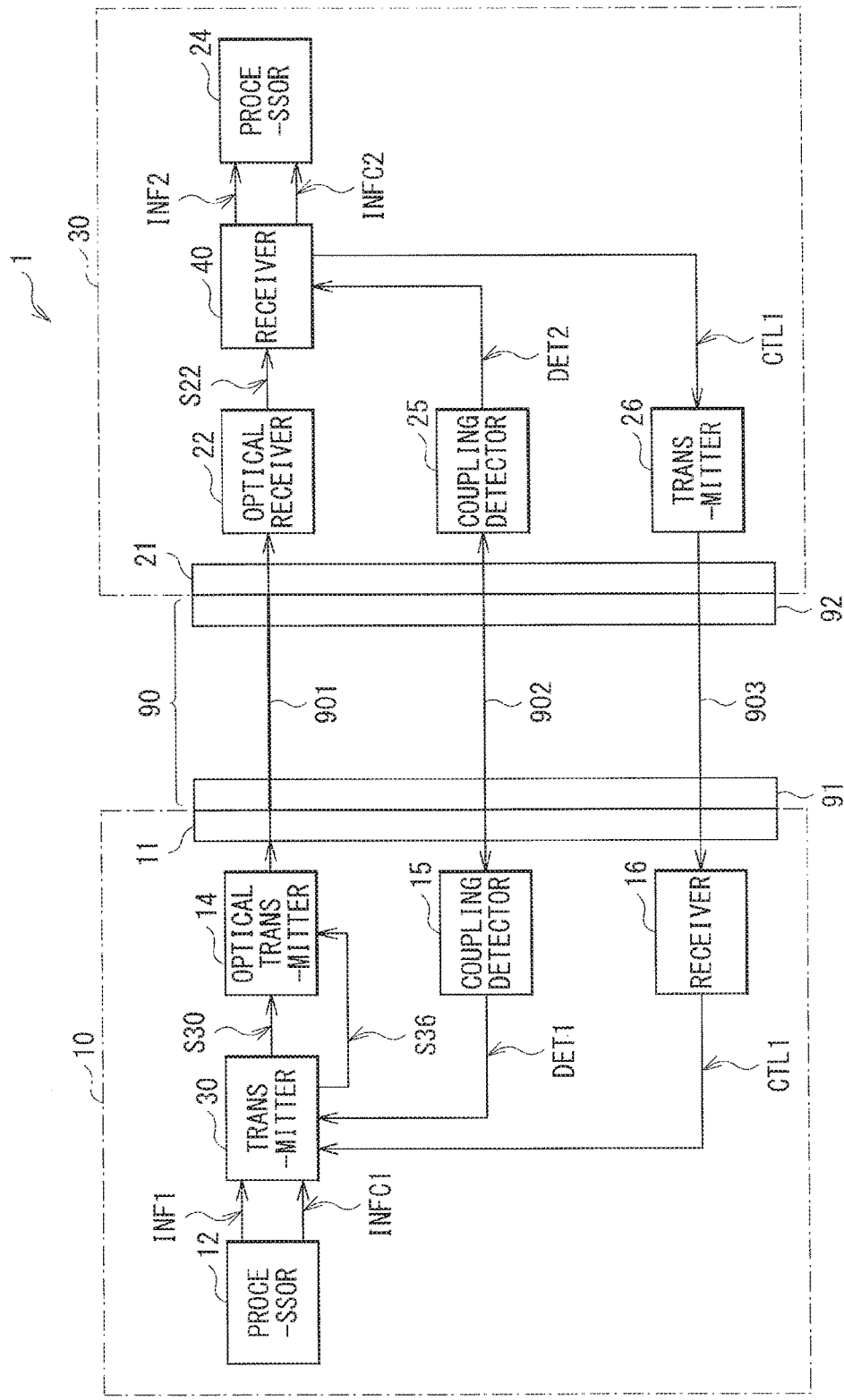

[FIG. 2]
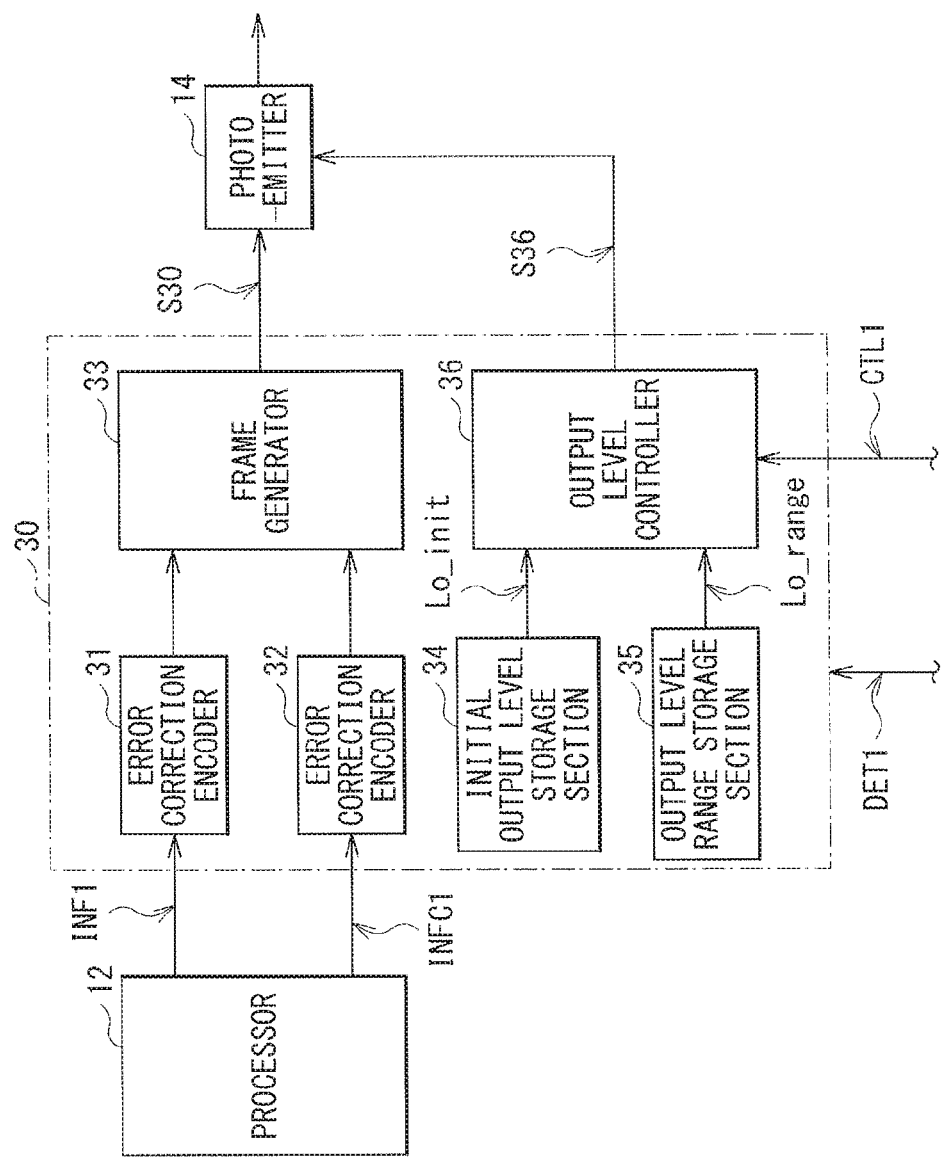

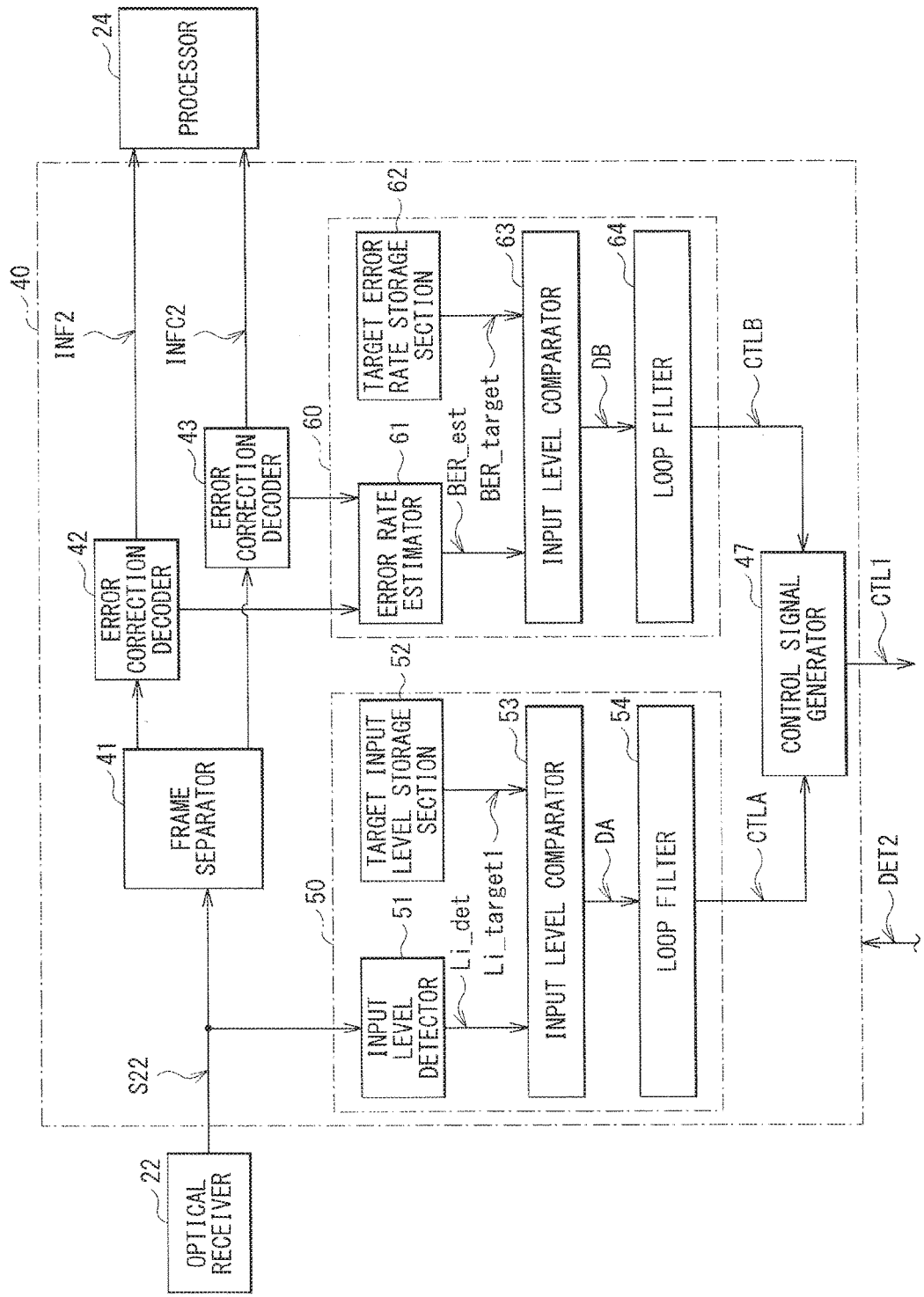
[FIG. 3]

[FIG. 4]
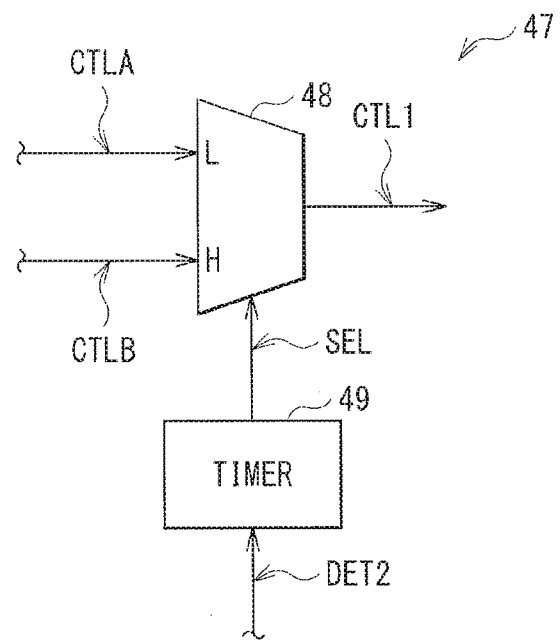

[FIG. 5]
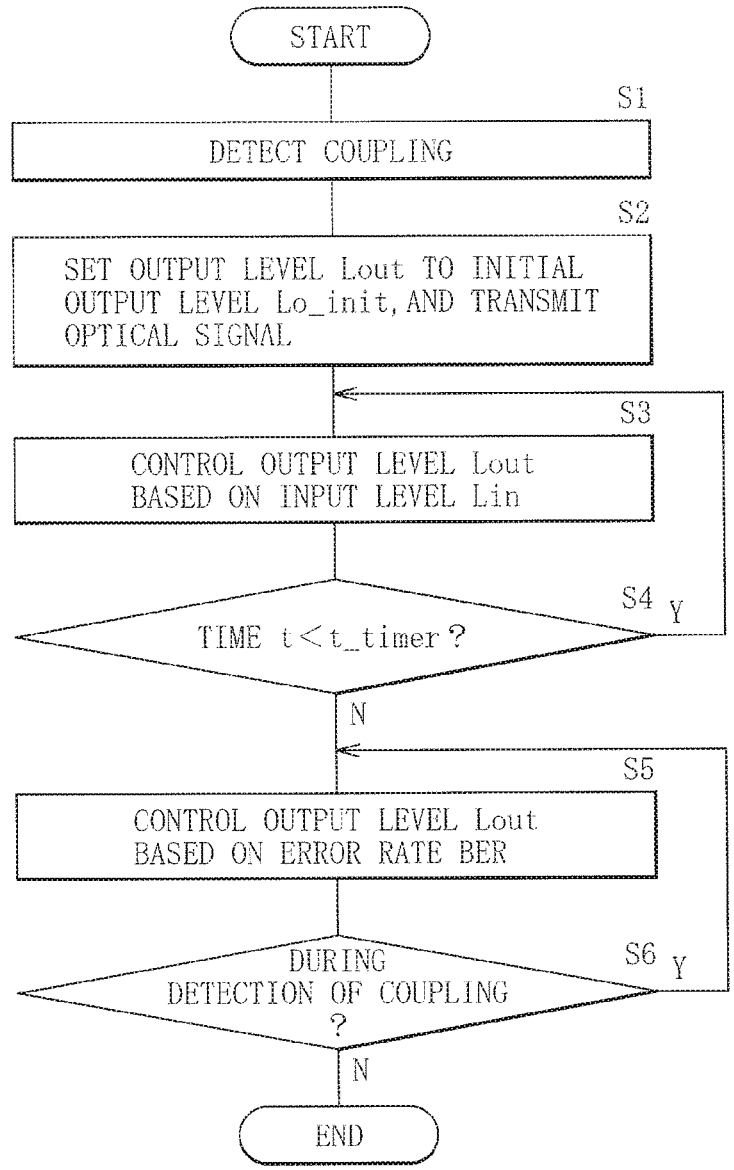

[ FIG. 6 ]
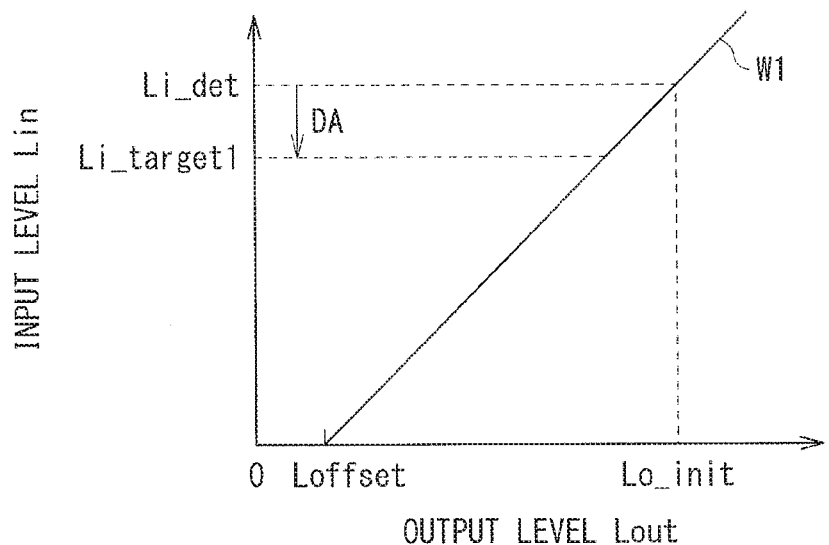
[ FIG. 7 ]
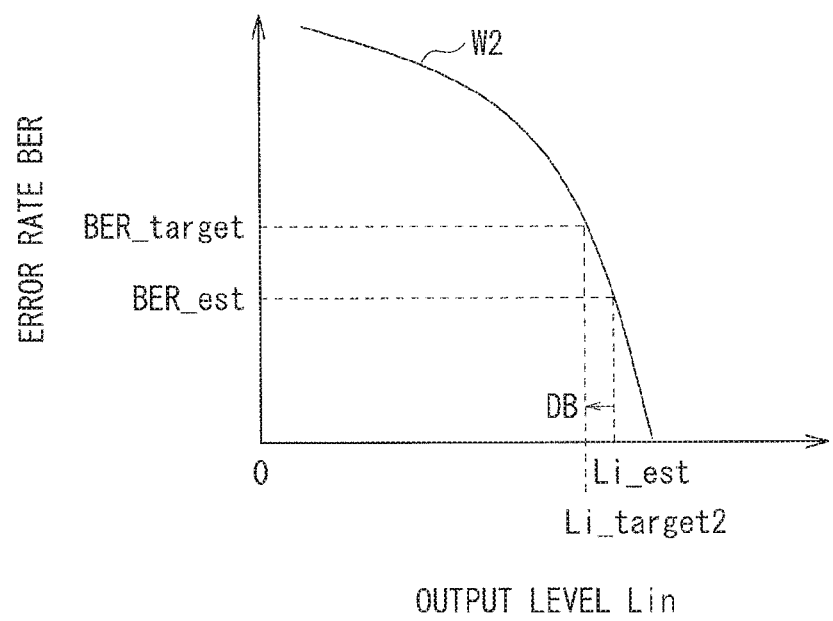

[FIG. 8]
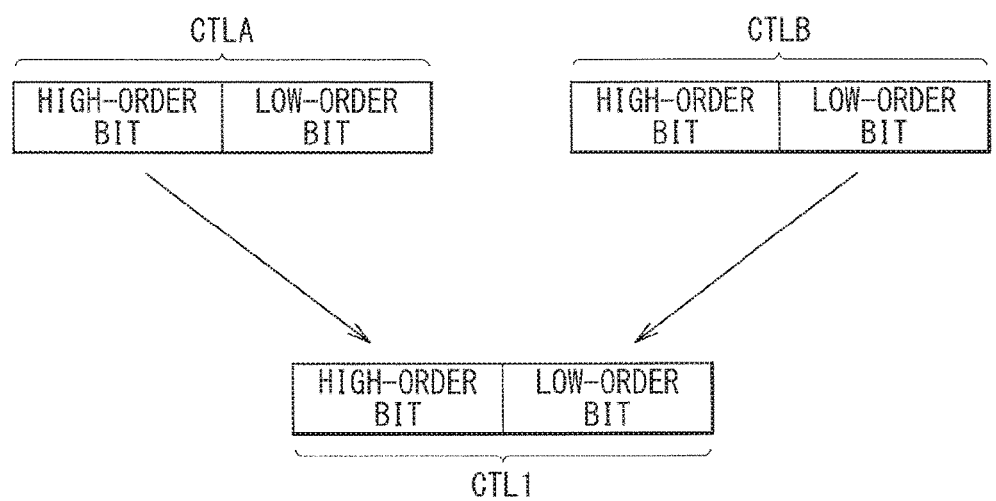

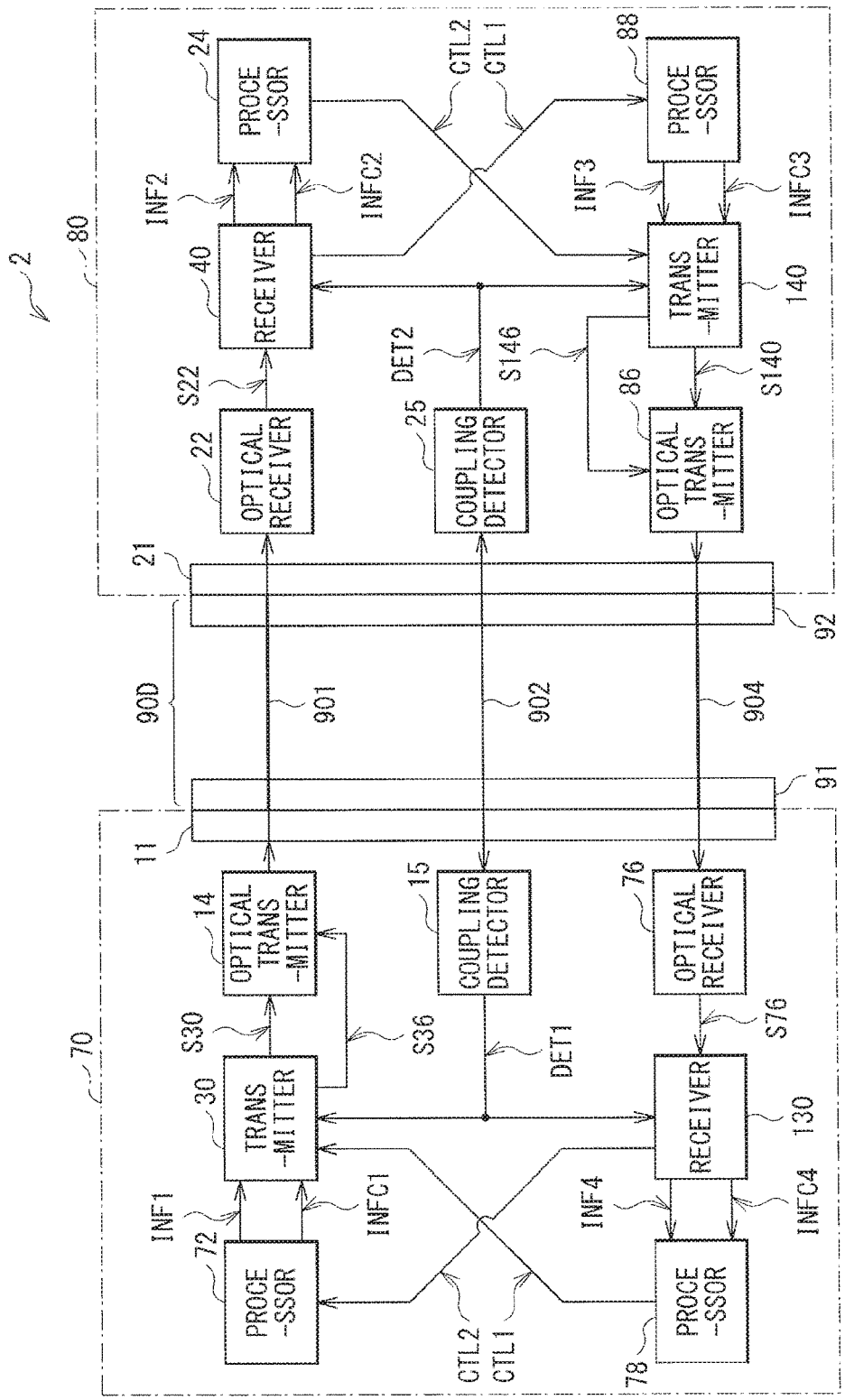
[FIG.9]

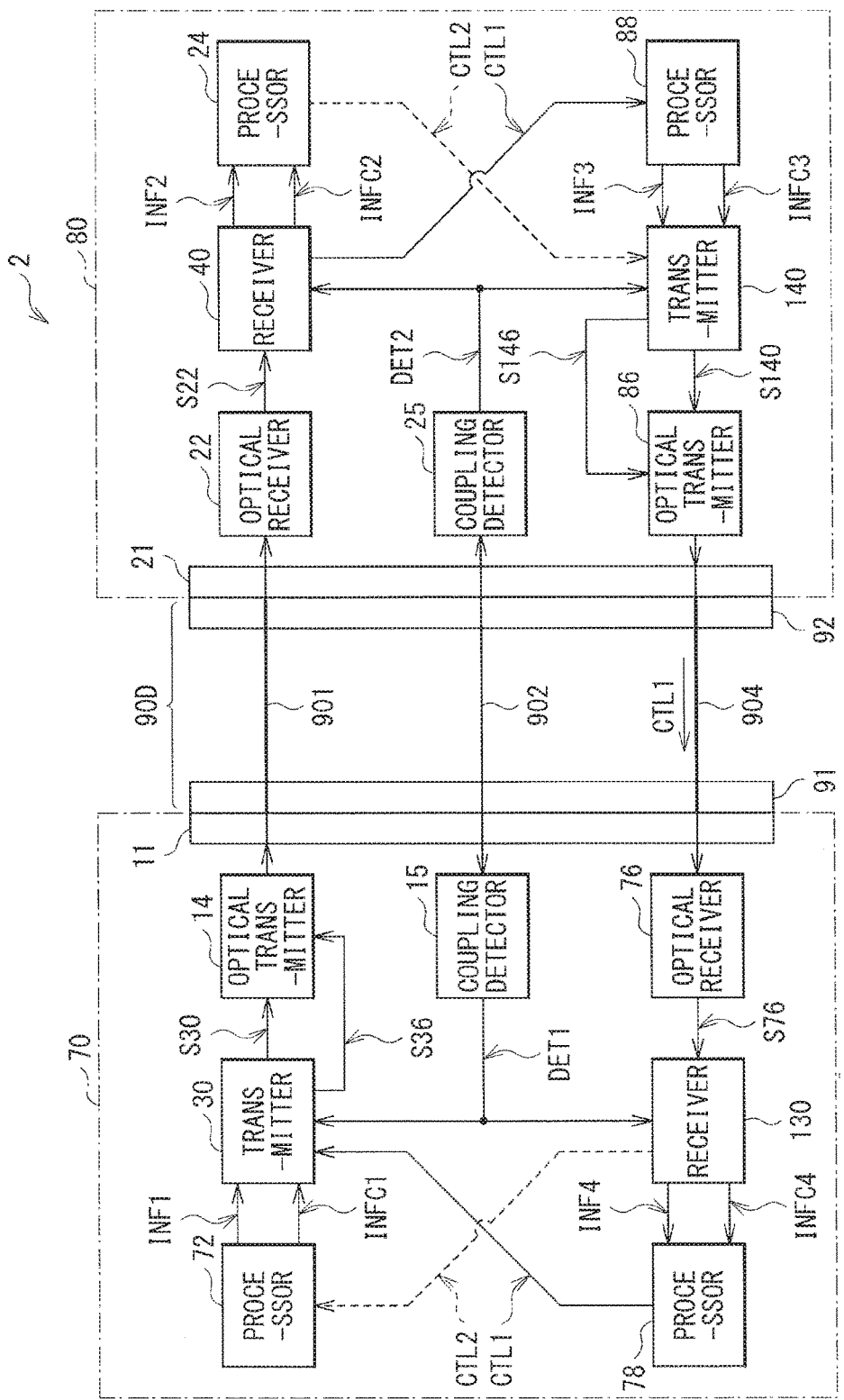
[ FIG. 10A ]

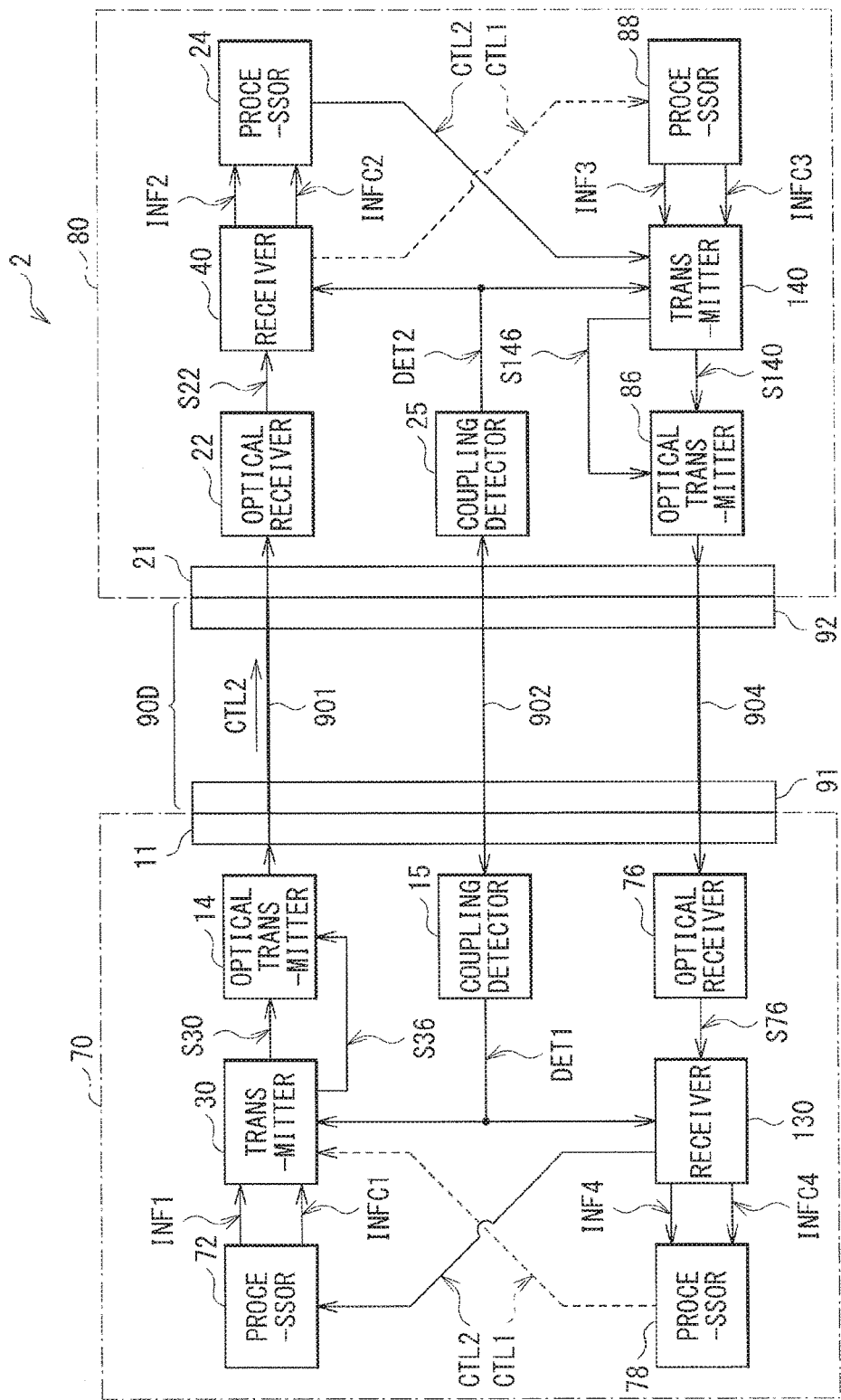
[FIG. 10B]

COMMUNICATION DEVICE, COMMUNICATION SYSTEM, AND COMMUNICATION METHOD

CROSS REFERENCE TO RELATED APPLICATIONS

This application claims the benefit of Japanese Priority Patent Application JP 2015-085525 filed Apr. 20, 2015, the entire contents of which are incorporated herein by reference.

TECHNICAL FIELD

The disclosure relates to a communication device configured to exchange data, a communication system including such a communication device, and a communication method used in such a communication system.

BACKGROUND ART

In association with high functionality and multi-functionality of electronic apparatuses in recent years, an amount of information to be exchanged between electronic apparatuses is increased. For example, the electronic apparatus is often coupled to other electronic apparatuses through wired communication. In the case of exchanging a lot of pieces of data, an optical fiber is often used in the wired communication.

In optical communication using an optical fiber, an output level of an optical signal outputted from a transmission device is often controlled. For example, PTLs 1 and 2 each disclose a communication system that controls an output level in a transmission device, based on an input level in a reception device. Moreover, for example, PTL 3 discloses a communication system that controls an output level in a transmission device, based on an error rate measured by a reception device.

CITATION LIST

Patent Literature

PTL 1
Japanese Unexamined Patent Application Publication No. 2010-154375
PTL 2
Japanese Unexamined Patent Application Publication No. 2004-32476
PTL 3
Japanese Unexamined Patent Application Publication No. 2002-164846

SUMMARY

Technical Problem

Such communication systems are desired to control the output level of the optical signal outputted from the transmission device at high accuracy. Moreover, such communication systems are expected to control the output level in a short time.

It is desirable to provide a communication device, a communication system, and a communication method that make it possible to control an output level at high accuracy in a short time.

Solution to Problem

According to an embodiment of the disclosure, there is provided a communication device including a first receiver configured to receive a data signal and generate a level control signal based on an initial level of the data signal and on an error rate of the data signal; and a transmitter configured to transmit the level control signal.

According to an embodiment of the disclosure, there is provided a communication system comprising a first communication device and a second communication device. The first communication device includes a first receiver configured to receive a data signal and generate a level control signal based on an initial level of the data signal and on an error rate of the data signal, and a first transmitter configured to transmit the level control signal. The second communication device includes a second receiver configured to receive the level control signal, and a second transmitter configured to transmit generate the data signal based on the level control signal.

According to an embodiment of the disclosure, there is provided a communication method comprising receiving, at a first communication device, a data signal from a second communication device; generating, by the first communication device, a level control signal based on an initial level of the data signal and on an error rate of the data signal; transmitting, from the first communication device to the second communication device, the level control signal; and generating, by the second communication device, the data signal based on the level control signal.

In the communication device, the communication system, and the communication method according to the respective embodiments of the disclosure, the first level control signal is generated, based on the first data signal, and then is transmitted. The first level control signal is generated, based on the input level of the first data signal and the number of errors of the first data signal.

Advantageous Effects of Invention

According to the communication device, the communication system, and the communication method of the respective embodiments of the disclosure, the first level control signal is generated, based on the input level of the first data signal and the number of errors of the first data signal, which makes it possible to control the output level at high accuracy in a short time. Note that effects described here are non-limiting. Effects achieved by the technology may be one or more of effects described in the disclosure. It is to be understood that both the foregoing general description and the following detailed description are exemplary, and are provided to provide further explanation of the technology as claimed.

BRIEF DESCRIPTION OF DRAWINGS

The accompanying drawings are included to provide a further understanding of the technology, and are incorporated in and constitute a part of this specification. The drawings illustrate embodiments and, together with the specification, serve to explain the principles of the technology.

FIG. 1 is a block diagram of a configuration example of a communication system according to an embodiment of the disclosure.

FIG. 2 is a block diagram of a configuration example of a transmitter illustrated in FIG. 1.

FIG. 3 is a block diagram of a configuration example of a receiver illustrated in FIG. 1.

FIG. 4 is a block diagram of a configuration example of a control signal generator illustrated in FIG. 3.

FIG. 5 is a flow chart of an operation example of the communication system illustrated in FIG. 1.

FIG. 6 is an explanatory diagram of an operation example of the communication system illustrated in FIG. 1.

FIG. 7 is another explanatory diagram of an operation example of the communication system illustrated in FIG. 1.

FIG. 8 is an explanatory diagram of an operation example of a control signal generator according to a modification example.

FIG. 9 is a block diagram of a configuration example of a communication system according to another modification example.

FIG. 10A is an explanatory diagram of an operation example of the communication system illustrated in FIG. 9.

FIG. 10B is another explanatory diagram of an operation example of the communication system illustrated in FIG. 9.

DESCRIPTION OF EMBODIMENTS

Some embodiments of the disclosure are described in detail below with reference to drawings.

Configuration Example

FIG. 1 illustrates a configuration example of a communication system (a communication system 1) according to an embodiment of the disclosure. The communication system 1 performs communication using optical signals. Note that a communication method according to an embodiment of the disclosure may be embodied by this embodiment, and description thereof is therefore given together.

The communication system 1 may include a transmission cable 90, a transmission device 10, and a reception device 20. The transmission device 10 and the reception device 20 are coupled to each other through the transmission cable 90.

The transmission cable 90 may include an optical fiber 901, electric wires 902 and 903, and connectors 91 and 92. The optical fiber 901 is adapted to transmit a data signal from the transmission device 10 to the reception device 20. The electric wire 902 is used to allow the transmission device 10 and the reception device 20 to detect coupling therebetween. The electric wire 903 is adapted to transmit a control signal CTL1 to be described later from the reception device 20 to the transmission device 10. The connector 91 is provided at a first end of the transmission cable 90, and is so configured as to be coupled to a connector 11 of the transmission device 10. The connector 92 is provided at a second end of the transmission cable 90, and is so configured as to be coupled to a connector 21 of the reception device 20.

(Transmission Device 10)

The transmission device 10 is adapted to transmit a data signal to the reception device 20 through the optical fiber 901. The transmission device 10 may include the connector 11, a processor 12, a transmitter 30, an optical transmitter 14, a coupling detector 15, and a receiver 16.

The connector 11 is adapted to be coupled to the connector 91 of the transmission cable 90.

The processor 12 is adapted to perform predetermined processing to generate data INF1 and control data INFC1 and supply the data INF1 and the control data INFC1 to the transmitter 30.

The transmitter 30 is adapted to generate a data signal S30, based on the data INF1, the control data INFC1, and a detection signal DET1. The transmitter 30 also has a function of controlling an output level Lout of an optical signal outputted from the optical transmitter 14 with use of a signal S36, based on the control signal CTL1.

FIG. 2 illustrates a configuration example of the transmitter 30. In this figure, the processor 12 and the optical transmitter 14 are illustrated together with the transmitter 30. The transmitter 30 may include error correction encoders 31 and 32, a frame generator 33, an initial output level storage section 34, an output level range storage section 35, and an output level controller 36.

The error correction encoder 31 is adapted to perform error correction encoding, based on the data INF1 to generate an error correction code of the data INF1. Further, the error correction encoder 31 supplies the generated error correction code together with the data INF1 to the frame generator 33. Likewise, the error correction encoder 32 is adapted to perform error correction encoding, based on control data INFC1 to generate an error correction code of the control data INFC1. Further, the error correction encoder 32 supplies the generated error correction code together with the control data INFC1 to the frame generator 33.

The frame generator 33 is adapted to generate a frame, based on the data INF1 and the error correction code of the data INF1 that are supplied from the error correction encoder 31, and the control data INFC1 and the error correction code of the control data INFC1 that are supplied from the error correction encoder 32. Further, the frame generator 33 supplies the frame to the optical transmitter 14 with use of the data signal S30.

The initial output level storage section 34 is adapted to store an initial output level Lo_init of an optical signal outputted from the optical transmitter 14. The initial output level Lo_init is an output level Lout of an optical signal that the optical transmitter 14 is supposed to output. The output level range storage section 35 is adapted to store a range Lo_range of the output level Lout of the optical signal outputted from the optical transmitter 14.

The output level controller 36 is adapted to control the output level Lout of the optical signal outputted from the optical transmitter 14 with use of the signal S36, based on the control signal CTL1. At this occasion, the output level controller 36 controls the output level Lout within the range Lo_range. The output level controller 36 is also adapted to set the output level Lout to the initial output level Lo_init at start of communication.

With such a configuration, the transmitter 30 generates the data signal S30, based on the data INF1 and the control data INFC1, and controls the output level Lout with use of the signal S36, based on the control signal CTL1. The transmitter 30 starts such transmission operation, based on the detection signal DET1.

The optical transmitter 14 is adapted to convert an electrical signal (the data signal S30) into an optical signal and output the optical signal. The optical transmitter 14 may include, for example, a laser diode. The optical transmitter 14 is also adapted to vary the output level Lout of the optical signal, based on the signal S36.

The coupling detector 15 is adapted to detect whether the transmission device 10 and the reception device 20 are coupled to each other. More specifically, the coupling detector 15 detects whether the transmission device 10 and the reception device 20 are coupled to each other, based on whether the coupling detector 15 is coupled to a coupling detector 25 to be described later of the reception device 20 through the electric wire 902. Further, the coupling detector 15 informs the transmitter 30 of a thus-obtained detection result with use of the detection signal DET1.

The receiver 16 is adapted to receive the control signal CTL1 transmitted from the reception device 20 through the electric wire 903. Further, the receiver 16 supplies the control signal CTL1 to the transmitter 30.

(Reception Device 20)

The reception device 20 is adapted to receive a data signal transmitted from the transmission device 10 through the optical fiber 901. The reception device 20 may include the connector 21, an optical receiver 22, a receiver 40, a processor 24, the coupling detector 25, and a transmitter 26.

The connector 21 is adapted to be coupled to the connector 92 of the transmission cable 90.

The optical receiver 22 is adapted to convert the optical signal transmitted from the transmission device 10 into an electrical signal to generate a data signal S22. The optical receiver 22 may include, for example, a photodiode.

The receiver 40 is adapted to generate data INF2 and control data INFC2, based on the data signal S22 and a detection signal DET2. The receiver 40 also has a function of generating the control signal CTL1.

FIG. 3 illustrates a configuration example of the receiver 40. In this figure, the optical receiver 22 and the processor 24 are illustrated together with the receiver 40. The receiver 40 may include control signal generators 50 and 60, a frame separator 41, error correction decoders 42 and 43, and a control signal generator 47.

The control signal generator 50 is adapted to generate a control signal CTLA, based on the data signal S22. The control signal generator 50 may include an input level detector 51, a target input level storage section 52, an input level comparator 53, and a loop filter 54. The input level detector 51 is adapted to detect an input level Lin (Li_det) of the optical signal received by the optical receiver 22, based on the data signal S22. The target input level storage section 52 is adapted to store a target value (a target input level Li_target1) of the input level Lin in normal operation. The input level comparator 53 is adapted to determine a difference DA between the input level Li_det and the target input level Li_target. The loop filter 54 is adapted to smooth the difference DA to generate the control signal CTLA.

The frame separator 41 is adapted to extract, based on the data signal S22, data and an error correction code of the data from a frame included in the data signal S22 and supply the data and the error correction code of the data to the error correction decoder 42, and to extract, based on the data signal S22, control data and an error correction code of the control data from the frame and supply the control data and the error correction code of the control data to the error correction decoder 43.

The error correction decoder 42 is adapted to perform error correction decoding, based on the data and the error correction code of the data that are supplied from the frame separator 41 to generate data INF2. The error correction decoder 42 also has a function of counting the number of errors in a predetermined period and supplying a thus-obtained counting result to the control signal generator 60. Likewise, the error correction decoder 43 is adapted to perform error correction decoding, based on the control data and the error correction code of the control data that are supplied from the frame separator 41 to generate control data INFC2. The error correction decoder 43 also has a function of counting the number of errors in a predetermined period and supplying a thus-obtained counting result to the control signal generator 60.

The control signal generator 60 is adapted to generate a control signal CTLB, based on the counting results supplied from the error correction decoders 42 and 43. The control signal generator 60 may include an error rate estimator 61, a target error rate storage section 62, an input level comparator 63, and a loop filter 64. The error rate estimator 61 is adapted to estimate an error rate BER (BER_est) in the communication system 1, based on the counting results supplied from the error correction decoders 42 and 43. The target error rate storage section 62 is configured to store a target value (a target error rate BER_target) of the error rate BER in the communication system 1. The input level comparator 63 is adapted to respectively convert the error rate BER_est and the target error rate BER_target into an input level Lin (Li_est) and an input level Lin (a target input level Li_target2), based on a predetermined function indicating relationship between the error rate BER and the input level Lin to determine a difference DB between the input level Li_est and the target input level Li_target2. The loop filter 64 is adapted to smooth the difference DB to generate the control signal CTLB.

The control signal generator 47 is adapted to generate the control signal CTL1, based on the control signals CTLA and CTLB.

FIG. 4 illustrates a configuration example of the control signal generator 47. The control signal generator 47 may include a selector 48 and a timer 49. The selector 48 is adapted to output the control signal CTLA as the control signal CTL1 when a signal SEL is at a low level (L), and to output the control signal CTLB as the control signal CTL1 when the signal SEL is at a high level (H). The timer 49 is adapted to turn the signal SEL to the low level (L), based on the detection signal DET2, until a predetermined time t_timer elapses from timing when the coupling detector 25 detects that the transmission device 10 and the reception device 20 are coupled to each other, and thereafter turn the signal. SEL to the high level (H). Thus, the control signal generator 47 outputs the control signal CTLA as the control signal CTL1 until the predetermined time t_timer elapses from timing when the transmission device 10 and the reception device 20 are coupled to each other, and thereafter outputs the control signal CTLB as the control signal CTL1.

With this configuration, the receiver 40 generates the data INF2 and the control data INFC2, based on the data signal S22, and generates the control signal CTL1. The receiver 40 starts such reception operation, based on the detection signal DET2.

The processor 24 is adapted to perform predetermined processing, based on the data INF2 and the control data INFC2.

The coupling detector 25 is adapted to detect whether the transmission device 10 and the reception device 20 are coupled to each other. More specifically, the coupling detector 25 detects whether the transmission device 10 and the reception device 20 are coupled to each other, based on whether the coupling detector 25 is coupled to the coupling detector 15 of the transmission device 10 through the electric wire 902. Further, the coupling detector 25 informs the receiver 40 of a thus-obtained detection result with use of the detection signal DET2.

The transmitter 26 is adapted to transmit the control signal CTL1 to the transmission device 10 through the electric wire 903.

Here, the control signal CTL1 corresponds to a specific but non-limiting example of "first level control signal" in an embodiment of the disclosure. The control signal generator 50 corresponds to a specific but non-limiting example of "first generator" in an embodiment of the disclosure. The input level detector 51 corresponds to a specific but non-limiting example of "first detector" in an embodiment of the disclosure. The control signal CTLA corresponds to a specific but non-limiting example of "first control signal" in an embodiment of the disclosure. The control signal generator 60 corresponds to a specific but non-limiting example of "second generator" in an embodiment of the disclosure. The error rate estimator 61 corresponds to a specific but non-limiting example of "second detector" in an embodiment of the disclosure. The control signal CTLB corresponds to a specific but non-limiting example of "second control signal" in an embodiment of the disclosure. The control signal generator 47 corresponds to a specific but non-limiting example of "control signal generator" in an embodiment of the disclosure.

[Operation and Workings]

Next, operation and workings of the communication system 1 according to the embodiment are described below.

(General Operation Outline)

First, general operation outline of the communication system 1 is described with reference to FIGS. 1 to 4. In the transmission device 10, the coupling detector 15 (see FIG. 1) detects whether the transmission device 10 and the reception device 20 are coupled to each other to generate the detection signal DET1. The receiver 16 receives the control signal CTL1 transmitted from the reception device 20 through the electric wire 903. The processor 12 performs predetermined processing to generate the data INF1 and the control data INFC1. The transmitter 30 starts transmission operation, based on the detection signal DET1. More specifically, the error correction encoder 31 (see FIG. 2) performs error correction encoding, based on the data INF1 to generate the error correction code of the data INF1, and supplies the generated error correction code together with the data INF1 to the frame generator 33. The error correction encoder 32 performs error correction encoding, based on the control data INFC1 to generate the error correction code of the control data INFC1, and supplies the generated error correction code together with the control data INFC1 to the frame generator 33. The frame generator 33 generates a frame, based on the data INF1 and the error correction code of the data INF1, and the control data INFC1 and the error correction code of the control data INFC1, and supplies the frame to the optical transmitter 14 with use of the data signal S30. The output level controller 36 controls the output level Lout of the optical signal outputted from the optical transmitter 14, based on the control signal CTL1 with use of the signal S36. The optical transmitter 14 (see FIG. 1) converts the electrical signal (the data signal S30) into an optical signal to output the optical signal, and varies the output level Lout of the optical signal, based on the signal S36.

In the reception device 20, the coupling detector 25 (see FIG. 1) detects whether the transmission device 10 and the reception device 20 are coupled to each other to generate the detection signal DET2. The optical receiver 22 converts the optical signal transmitted from the transmission device 10 into an electrical signal to generate the data signal S22. The receiver 40 starts transmission operation, based on the detection signal DET2. More specifically, the control signal generator 50 (see FIG. 3) generates the control signal CTLA, based on the data signal S22. The frame separator 41 extracts the data and the error correction code of the data from the frame included in the data signal S22 to supply the data and the error correction code of the data to the error correction decoder 42, and extracts the control data and the error correction code of the control data from the frame to supply the control data and the error correction code of the control data to the error correction decoder 43. The error correction decoder 42 performs error correction decoding, based on the data and the error correction code of the data that are supplied from the frame separator 41 to generate the data INF2, and counts the number of errors in a predetermined period, and then supplies the thus-obtained counting result to the control signal generator 60. The error correction decoder 43 performs error correction decoding, based on the control data and the error correction code of the control data that are supplied from the frame separator 41 to generate the control data INFC2, and counts the number of errors in a predetermined period, and then supplies the thus-obtained counting result to the control signal generator 60. The control signal generator 60 generates the control signal CTLB, based on the counting results supplied from the error correction decoders 42 and 43. The control signal generator 47 generates the control signal CTL1, based on the control signals CTLA and CTLB. The processor 24 (see FIG. 1) performs predetermined processing, based on the data INF2 and the control data INFC2. The transmitter 26 transmits the control signal CTL1 to the transmission device 10 through the electric wire 903.

(Detailed Operation)

Next, control operation of the output level Lout of the optical signal outputted from the optical transmitter 14 is described in detail below.

FIG. 5 illustrates an operation example of the communication system 1. In the communication system 1, after the transmission device 10 and the reception device 20 are coupled to each other, the output level Lout is first controlled, based on the control signal CTLA, and thereafter, the output level Lout is controlled, based on the control signal CTLB. This operation is described in detail below.

First, the communication system 1 performs coupling detection (step S1). More specifically, the coupling detector 15 of the transmission device 10 detects coupling to the coupling detector 25 through the electric wire 902, and informs the transmitter 30 of a thus-obtained detection result with use of the detection signal DET1. Thus, the coupling detector 15 instructs the transmitter 30 to start transmission operation. Likewise, the coupling detector 25 of the reception device 20 detects coupling to the coupling detector 15 through the electric wire 902, and informs the receiver 40 of a thus-obtained detection result with use of the detection signal DET2. Thus, the coupling detector 25 instructs the receiver 40 to start reception operation. Note that in a case where the coupling detectors 15 and 25 do not detect the coupling, the process does not proceed to next step S2.

Next, the transmission device 10 sets the output level Lout to the initial output level Lo_init, and transmits the optical signal (step S2). More specifically, first, the error correction encoder 31 performs error correction encoding, based on the data INF1 to generate the error correction code of the data INF1, and supplies the generated error correction code together with the data INF1 to the frame generator 33. Likewise, the error correction encoder 32 performs error correction encoding, based on the control data INFC1 to generate the error correction code of the control data INFC1, and supplies the generated error correction code together with the control data INFC1 to the frame generator 33. Subsequently, the frame generator 33 generates a frame, based on the data INF1 and the error correction code of the data INF1, and the control data INFC1 and the error correction code of the control data INFC1, and supplies the frame to the optical transmitter 14 with use of the data signal S30. The optical transmitter 14 generates an optical signal, based on the data signal S30. At this occasion, the output level controller 36 sets the output level Lout of the optical signal to the initial output level Lo_init.

Next, the communication system 1 controls the output level Lout of the optical signal outputted from the optical transmitter 14, based on the input level Lin of the optical signal received by the optical receiver 22 (step S3).

FIG. 6 illustrates control operation of the output level Lout in the step S3. In FIG. 6, a horizontal axis indicates the output level Lout, and a vertical axis indicates the input level Lin. A characteristic W1 indicates relationship between the output level Lout and the input level Lin in the communication system 1. In the communication system 1, when the output level Lout is larger than a certain level Loffset, the input level Lin is varied. The level Loffset corresponds to loss of optical transmission lines (such as the optical fiber 901 and the connectors 91, 92, 11, and 21) and minimum optical sensitivity of the optical receiver 22. The level Loffset is varied depending on a coupling state when a user couples the transmission cable 90 to the transmission device 10 and the reception device 20. In other words, for example, when dust or any other matter is present in proximity to an optical terminal of the connector, loss is increased to cause an increase of the level Loffset.

First, in the reception device 20, the input level detector 51 of the control signal generator 50 detects the input level Lin (Li_det) of the optical signal received by the optical receiver 22, based on the data signal S22. In this example, the input level Li_det is higher than the target input level Li_target1. The input level comparator 53 determines the difference DA between the input level Li_det and the target input level Li_target1. Then, the loop filter 54 smoothes the difference DA to generate the control signal CTLA. The control signal generator 47 outputs the control signal CTLA as the control signal CTL1. In other words, since the predetermined time t_timer does not elapse from timing when the transmission device 10 and the reception device 20 are coupled to each other, the control signal generator 47 outputs the control signal CTLA as the control signal CTL1. Subsequently, the transmitter 26 transmits the control signal CTL1 to the transmission device 10 through the electric wire 903.

The receiver 16 of the transmission device 10 receives the control signal CTL1 through the electric wire 903. Then, the output level controller 36 varies the output level Lout, based on the control signal CTL1. Thus, the input level Lin is varied toward the target input level Li_target1.

In the step S3, the error correction decoder 42 performs error correction decoding to generate the data INF2, and counts the number of errors in a predetermined period. Likewise, the error correction decoder 43 performs error correction decoding to generate the control data INFC2, and counts the number of errors in a predetermined period. These numbers are used in step S5 to be described later.

The communication system 1 repeats this operation until the predetermined time t_timer elapses from the timing when the transmission device 10 and the reception device 20 are coupled to each other (step S4). Thus, in the communication system 1, negative feedback control is performed to allow the input level Lin to gradually approach the target input level Li_target1.

After a lapse of the predetermined time t_timer, the communication system 1 controls the output level Lout of the optical signal outputted from the optical transmitter 14, based on the error rate BER (step S5).

FIG. 7 illustrates control operation of the output level Lout in the step S5. In FIG. 7, a horizontal axis indicates the input level Lin, and a vertical axis indicates the error rate BER. As indicated by a characteristic W2, the error rate BER may be represented as a function of the input level Lin.

First, in the reception device 20, the error rate estimator 61 of the control signal generator 60 estimates the error rate BER (BER_est) in the communication system 1, based on the counting results supplied from the error correction decoders 42 and 43. In this example, the error rate BER_est is lower than the target error rate BER_target. The input level comparator 63 respectively converts the error rate BER_est and the target error rate BER_target into the input level Lin (Li_est), and the input level Lin (a target input level Li_target2), based on the characteristic W2 to determine a difference DB between the input level Li_est and the target input level Li_target2. Thereafter, the loop filter 64 smoothes the difference DB to generate the control signal CTLB. The control signal generator 47 outputs the control signal CTLB as the control signal CTL1. In other words, since the predetermined time t_timer elapses from the timing when the transmission device 10 and the reception device 20 are coupled to each other, the control signal generator 47 outputs the control signal CTLB as the control signal CTL1. The transmitter 26 transmits the control signal CTL1 to the transmission device 10 through the electric wire 903.

The receiver 16 of the transmission device 10 receives the control signal CTL1 through the electric wire 903. The output level controller 36 varies the output level Lout, based on the control signal CTL1. Thus, the input level Lin is varied toward the target input level Li_target2.

The communication system 1 repeats the operation of the step S5 as long as coupling between the transmission device 10 and the reception device 20 is detected (step S6). Thus, in the communication system 1, negative feedback control is performed, and the input level Lin is converged around the target input level Li_target2.

When the transmission device 10 and the reception device 20 are disconnected, this flow ends.

The communication system 1 controls the output level Lout in such a manner. This makes it possible to appropriately control the output level Lout in response to, for example but not limited to, loss of the optical transmission lines (such as the optical fiber 901 and the connectors 91, 11, and 21) and a coupling state when the user couples the transmission cable 90 to the transmission device 10 and the reception device 20. In other words, for example, in a case where such control of the output level Lout is not performed, a method of setting the output level Lout to a higher level may be so adopted as to allow for normal communication in any case. In such a case, however, power consumption may be increased, and the laser diode of the optical transmitter 14 may be deteriorated. Moreover, in a case where the optical signal is leaked from the optical fiber 901 due to some reason, the optical signal having the high output level Lout may strike the user, which may impair safety. In contrast, the communication system 1 controls the output level Lout, which makes it possible to reduce power consumption and to suppress deterioration of the laser diode. Moreover, even if the optical signal is leaked from the optical fiber 901 due to some reason, this makes it possible to reduce the output level Lout of the optical signal, thereby enhancing safety.

In the communication system 1, in the predetermined time t_timer after start of communication, the output level Lout is controlled, based on the input level Lin of the optical signal received by the optical receiver 22. This makes it possible to control the output level Lout in a short time in the communication system 1. In other words, for example, in a case where the output level Lout is controlled, based on the error rate BER, a certain time is necessary to estimate the error rate BER, and start of control of the output level Lout is therefore delayed. In the communication system 1, the output level Lout is controlled, based on the input level Lin, which makes it possible to start control of the output level Lout immediately after the optical receiver 22 receives the optical signal. This makes it possible to control the output level Lout in a short time.

Moreover, in the communication system 1, the output level Lout is controlled, based on the error rate BER after the predetermined time t_timer elapses after start of communication. This makes it possible to control the output level Lout at high accuracy in the communication system 1. In other words, for example, in a case where the output level Lout is controlled, based on the input level Lin of the optical signal received by the optical receiver 22, the actual error rate BER is not directly known. This may decrease the error rate BER to decrease communication quality. In the communication system 1, it is possible to control the output level Lout so as to allow the error rate BER to have a desired value. This allows for control of the output level Lout at high accuracy.

Hence, in the communication system 1, the output level Lout is controlled, based on the input level Lin of the optical signal received by the optical receiver 22 and the error rate BER. This makes it possible to control the output level at high accuracy in a short time.

[Effects]

In the foregoing embodiment, the output level is controlled, making makes it possible to reduce power consumption and suppress deterioration of the laser diode. Moreover, this allows for enhancement of safety.

In the embodiment, the output level is controlled, based on the input level of the optical signal received by the optical receiver and the error rate. This makes it possible to control the output level at high accuracy in a short time.

Modification Example 1

In the foregoing embodiment, the control signal generator 47 generates the control signal CTL1 by time-divisional switching between the control signals CTLA and CTLB; however, the method of generating the control signal CTL1 is not limited thereto. For example, in a control signal generator 47B illustrated in FIG. 8, a high-order bit of the control signal CTLA and a low-order bit of the control signal CTLB may be respectively set to a high-order bit of the control signal CTL1 and a low-order bit of the control signal CTL1 to generate the control signal CTL1. In this case, after start of communication, first, the control signal generator 50 generates the control signal CTLA. At this occasion, since a certain time is necessary to estimate the error rate BER, the control signal generator 60 does not generate the control signal CTLB yet. Accordingly, the control signal CTL1 generated by the control signal generator 47B includes only the high-order bit of the control signal CTLA. Thereafter, the control signal generator 60 generates the control signal CTLB after the error rate BER is estimated. Thus, the control signal CTL1 generated by the control signal generator 47B may include the high-order bit of the control signal CTLA and the low-order bit of the control signal CTLB.

Modification Example 2

In the foregoing embodiment, the communication system is configured with use of the transmission device 10 and the reception device 20. The configuration of the communication system is not limited thereto. Alternatively, the communication system may be configured with use of, for example, two communication devices that are able to transmit and receive a data signal. The modification example is described in detail below.

FIG. 9 illustrates a configuration example of a communication system 2 according to the modification example. The communication system 2 may include a transmission cable 90D and communication devices 70 and 80. The transmission cable 90D may include optical fibers 901 and 904. The optical fiber 901 is adapted to transmit a data signal from the communication device 70 to the communication device 80. The optical fiber 904 is adapted to transmit a data signal from the communication device 80 to the communication device 70.

The communication device 70 may include the connector 11, a processor 72, the transmitter 30, the optical transmitter 14, an optical receiver 76, a receiver 130, a processor 78, and the coupling detector 15. The communication device 80 may include the optical receiver 22, the receiver 40, a processor 84, a processor 88, a transmitter 140, an optical transmitter 86, and the coupling detector 25.

As with the processor 12 according to the foregoing embodiment, the processor 72 of the communication device 70 is adapted to perform predetermined processing to generate the data INF1 and the control data INFC1 and supply the data INF1 and the control data INFC1 to the transmitter 30. At this occasion, the processor 72 generates the control data INFC1, based on a control signal CTL2 supplied from the receiver 130. The control signal CTL2 is a signal for controlling the output level Lout of the optical signal outputted from the optical transmitter 86 of the communication device 80.

As with the processor 24 according to the foregoing embodiment, the processor 84 of the communication device 80 is adapted to perform predetermined processing, based on the data INF2 and the control data INFC2. At this occasion, the processor 84 supplies the control signal CTL2 included in the control data INFC2 to the transmitter 140.

As with the processor 72 of the communication device 70, the processor 88 is adapted to perform predetermined processing to generate data INF3 and control data INFC3 and supply the data INF3 and the control data INFC3 to the transmitter 140. At this occasion, the processor 88 generates the control data INFC3, based on the control signal CTL1 supplied from the receiver 40.

As with the transmitter 30 of the communication device 70, the transmitter 140 is adapted to generate a data signal S140, based on the data INF3, the control data INFC3, and the detection signal DET2 and to control the output level Lout of the optical signal outputted from the optical transmitter 86, based on the control signal CTL2 supplied from the processor 84.

As with the optical transmitter 14 of the communication device 70, the optical transmitter 86 is adapted to convert an electrical signal (the data signal S140) into an optical signal and output the optical signal, and to vary the output level Lout of the optical signal, based on the signal S146.

As with the optical receiver 22 of the communication device 80, the optical receiver 76 of the communication device 70 is adapted to convert an optical signal transmitted from the communication device 80 into an electrical signal to generate a data signal S76.

As with the receiver 40 of the communication device 80, the receiver 130 is adapted to generate data INF4 and control data INFC4, based on the data signal S76 and the detection signal DET1, and to generate the control signal CTL2.

As with the processor 84 of the communication device 80, the processor 78 is adapted to perform predetermined processing, based on the data INF4 and the control data INFC4.

At this occasion, the processor 78 supplies the control signal CTL1 included in the control data INFC4 to the transmitter 30.

Here, the control signal CTL1 corresponds to a specific but non-limiting example of "first level control signal" in an embodiment of the disclosure. The control signal CTL2 corresponds to a specific but non-limiting example of "second level control signal" in an embodiment of the disclosure.

FIG. 10A illustrates operation in a case where the output level Lout of the optical signal outputted from the optical transmitter 14 of the communication device 70 is controlled. In FIG. 10A, a key signal in this operation is indicated by a solid line, and other signals are indicated by a broken line. In this case, the receiver 40 of the communication device 80 supplies the control signal CTL1 to the transmitter 30 of the communication device 70 through the optical fiber 904. Thus, in the communication system 2, the output level Lout of the optical signal outputted from the optical transmitter 14 is controlled in a similar manner to that in the communication system 1 according to the foregoing embodiment.

FIG. 10B illustrates operation in a case where the output level Lout of the optical signal outputted from the optical transmitter 86 of the communication device 80 is controlled. In FIG. 10B, a key signal in this operation is indicated by a solid line, and other signals are indicated by a broken line. In this case, the receiver 130 of the communication device 70 supplies the control signal CTL2 to the transmitter 140 of the communication device 80 through the optical fiber 901. Accordingly, in the communication system 2, the output level Lout of the optical signal outputted from the optical transmitter 86 is controlled in a similar manner to that in the communication system 1.

Although the technology has been described above with reference to the example embodiment and the modification examples, the technology is not limited thereto, and may be modified in a variety of ways.

For example, in the foregoing embodiment, the control signal generator 47 is provided with the timer 49 that generates the signal SEL; however, the control signal generator 47 is not limited thereto. Alternatively, there may be provided a signal generator that turns the signal SEL to the low level until the control signal CTLB is generated and turns to the signal SEL to the high level after the control signal CTLB is generated.

Note that the effects described in the present specification are illustrative and non-limiting. Effects achieved by the technology may be effects other than those described above.

It is to be noted that the contents of the technology may have the following configurations.

(1) A communication device, comprising: a first receiver configured to receive a data signal and generate a level control signal based on an initial level of the data signal and on an error rate of the data signal; and a transmitter configured to transmit the level control signal.

(2) The communication device according to (1), further comprising: a second receiver configured to receive an optical signal from an external communication device and to generate the data signal based on the optical signal.

(3) The communication device according to (1) or (2), wherein the first receiver comprises: a first control signal generator configured to generate a first control signal based on the initial level of the data signal; and a second control signal generator configured to generate a second control signal based on the error rate of the data signal.

(4) The communication device according to (3), wherein the first receiver comprises: a third control signal generator configured to receive the first control signal and the second control signal, and to generate the level control signal.

(5) The communication device according to (4), wherein the third control signal generator is configured to generate the level control signal by outputting the first control signal during a first time period, and the second control signal during a second time period subsequent to the first time period.

(6) The communication device according to (4) or (5), wherein the third control signal generator is configured to generate the level control signal by outputting a high order bit of the first control signal and a low order bit of the second control signal.

(7) The communication device according to any one of (3) to (6), wherein the first receiver further comprises: at least one error correction decoder respectively configured to determine a number of errors in the data signal, wherein the second control signal generator is configured to generate the second control signal based on the determined number of errors in the data signal.

(8) The communication device according to any one of (1) to (7), further comprising: a connector configured to receive a transmission cable, wherein the transmission cable includes an optical fiber and an electric wire.

(9) The communication device according to (8), further comprising: a coupling detector configured to determine a connection state of the transmission cable.

(10) A communication system, comprising: a first communication device including a first receiver configured to receive a data signal and generate a level control signal based on an initial level of the data signal and on an error rate of the data signal, and a first transmitter configured to transmit the level control signal; and a second communication device including a second receiver configured to receive the level control signal, and a second transmitter configured to transmit generate the data signal based on the level control signal.

(11) The communication system according to (10), wherein: the second communication device includes a third transmitter configured to convert the data signal into an optical signal, and the first communication device includes a third receiver configured to receive the optical signal and to generate the data signal based on the optical signal.

(12) The communication system according to (10) or (11), wherein the first receiver comprises: a first control signal generator configured to generate a first control signal based on the initial level of the data signal; and a second control signal generator configured to generate a second control signal based on the error rate of the data signal.

(13) The communication system according to (12), wherein the first receiver comprises: a third control signal generator configured to receive the first control signal and the second control signal, and to generate the level control signal.

(14) The communication system according to (13), wherein the third control signal generator is configured to generate the level control signal by outputting the first control signal during a first time period, and the second control signal during a second time period subsequent to the first time period.

(15) The communication system according to (13) or (14), wherein the third control signal generator is configured to generate the level control signal by outputting a high order bit of the first control signal and a low order bit of the second control signal.

(16) The communication system according to any one of (12) to (15), wherein the first receiver further comprises: at least one error correction decoder respectively configured to determine a number of errors in the data signal, wherein the second control signal generator is configured to generate the second control signal based on the determined number of errors in the data signal.

(17) The communication system according to any one of (10) to (16), further comprising: a transmission cable connected between the first communication device and the second communication device, wherein the transmission cable includes optical fiber and an electric wire.

(18) The communication system according to (17), further comprising: a coupling detector configured to determine a connection state of the transmission cable.

(19) A communication method comprising: receiving, at a first communication device, a data signal from a second communication device; generating, by the first communication device, a level control signal based on an initial level of the data signal and on an error rate of the data signal; transmitting, from the first communication device to the second communication device, the level control signal; and generating, by the second communication device, the data signal based on the level control signal.

(20) The communication method according to (19), wherein the receiving and transmitting is performed using a transmission cable connected between the first communication device and the second communication device, wherein the transmission cable includes an optical fiber and an electric wire.

(21) A communication device including:
a receiver configured to generate a first level control signal, based on an input level of a first data signal and number of errors of the first data signal; and
a transmitter configured to transmit the first level control signal.

(22) The communication device according to (21), wherein the receiver includes
a first generator configured to generate a first control signal, based on the input level,
a second generator configured to generate a second control signal, based on the number of errors, and
a level control signal generator configured to generate the first level control signal, based on the first control signal and the second control signal.

(23) The communication device according to (22), wherein the level control signal generator generates the first level control signal by time-divisional switching between the first control signal and the second control signal.

(24) The communication device according to (23), wherein the level control signal generator outputs the first control signal as the first level control signal in a first period, and outputs the second control signal as the first level control signal in a second period subsequent to the first period.

(25) The communication device according to (22), wherein the first control signal and the second control signal comprise digital codes, and
the level control signal generator generates the first level control signal, based on predetermined number of bits out of a plurality of bits of the first control signal and predetermined number of bits out of a plurality of bits of the second control signal.

(26) The communication device according to (25), wherein the level control signal generator generates the first level control signal, based on predetermined number of bits from most significant bit out of the plurality of bits of the first control signal and predetermined number of bits from least significant bit out of the plurality of bits of the second control signal.

(27) The communication device according to any one of (22) to (26), wherein the first generator includes a first detector configured to detect the input level, and generates the first control signal, based on the input level detected by the first detector and a predetermined input level.

(28) The communication device according to any one of (22) to (27), wherein the second generator includes a second detector configured to detect an error rate, based on the number of errors, and generates the second control signal, based on the error rate and a predetermined error rate.

(29) The communication device according to any one of (21) to (28), wherein
the first data signal includes an error correction code, and the receiver determines the number of errors, based on the error correction code.

(30) The communication device according to any one of (21) to (29), wherein
the first data signal includes a second level control signal, and
the transmitter transmits a second data signal including the first level control signal and having an output level that corresponds to the second level control signal.

(31) The communication device according to (30), wherein the transmitter transmits the second data signal through a laser diode.

(32) The communication device according to any one of (21) to (31), wherein the receiver receives the first data signal through a photodiode.

(33) A communication system including:
a first communication device including a first receiver and a first transmitter, the first receiver being configured to receive a first level control signal, and the first transmitter being configured to transmit a first data signal having an output level that corresponds to the first control signal; and
a second communication device including a second receiver and a second transmitter, the second receiver being configured to receive the first data signal and to generate, based on an input level of the first data signal and number of errors of the first data signal, the first level control signal, and the second transmitter being configured to transmit the first level control signal.

(34) A communication method comprising:
causing a first communication device to receive a first level control signal and to transmit a first data signal having an output level that corresponds to the first level control signal; and
causing a second communication device to receive the first data signal and to generate, based on an input level of the first data signal and number of errors of the first data signal, the first level control signal and then transmit the first level control signal.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1, 2 communication system
10 transmission device
11 connector
12 processor
14 optical transmitter
15 coupling detector
16 receiver
20 reception device 21 connector
22 optical receiver
24 processor
25 coupling detector
26 transmitter
30 transmitter
31, 32 error correction encoder
33 frame generator
34 initial output level storage section
35 output level range storage section
36 output level controller
40 receiver
41 frame separator
42, 43 error correction decoder
47 control signal generator
48 selector
49 timer
50, 60 control signal generator
51 input level detector
52 target input level storage section
53 input level comparator
54 loop filter
61 error rate estimator
62 target error rate storage section
63 input level comparator
64 loop filter
70, 80 communication device
72 processor
76 optical receiver
78 processor
84 processor
86 optical transmitter
88 processor
90, 901) transmission cable
130 receiver
140 transmitter
901, 904 optical fiber
902, 903 electric wire
BER, BER_est error rate
CTL1, CTL2, CTLA, CTLB control signal
DA, DB difference
DET1, DET2 detection signal
INF1 to INF4 data
INFC1 to INFC4 control data
Lin, Li_det, Li_est input level
Li_target1, Li_target2 target input level
Lout, Lo_init output level
Lo_range range
S22, S30, S76, S140 data signal
SEL signal
S36, S146 signal

The invention claimed is:

1. A communication device, comprising:
a first receiver configured to receive a data signal and generate a level control signal based on an initial level of the data signal and on an error rate of the data signal; and
a transmitter configured to transmit the level control signal,
wherein the first receiver comprises:
a first control signal generator configured to generate a first control signal based on the initial level of the data signal, and
a second control signal generator configured to generate a second control signal based on the error rate of the data signal.

2. The communication device according to claim 1, further comprising:
a second receiver configured to receive an optical signal from an external communication device and to generate the data signal based on the optical signal.

3. The communication device according to claim 1, wherein the first receiver comprises:
a third control signal generator configured to receive the first control signal and the second control signal, and to generate the level control signal.

4. The communication device according to claim 3, wherein the third control signal generator is configured to generate the level control signal by outputting the first control signal during a first time period, and the second control signal during a second time period subsequent to the first time period.

5. The communication device according to claim 3, wherein the third control signal generator is configured to generate the level control signal by outputting a high order bit of the first control signal and a low order bit of the second control signal.

6. The communication device according to claim 1, wherein the first receiver further comprises:
at least one error correction decoder respectively configured to determine a number of errors in the data signal,
wherein the second control signal generator is configured to generate the second control signal based on the determined number of errors in the data signal.

7. The communication device according to claim 1, further comprising:
a connector configured to receive a transmission cable, wherein the transmission cable includes an optical fiber and an electric wire.

8. The communication device according to claim 7, further comprising:
a coupling detector configured to determine a connection state of the transmission cable.

9. A communication system, comprising:
a first communication device including
a first receiver configured to receive a data signal and generate a level control signal based on an initial level of the data signal and on an error rate of the data signal, and
a first transmitter configured to transmit the level control signal; and
a second communication device including
a second receiver configured to receive the level control signal, and
a second transmitter configured to transmit generate the data signal based on the level control signal,
wherein the first receiver comprises:
a first control signal generator configured to generate a first control signal based on the initial level of the data signal, and
a second control signal generator configured to generate a second control signal based on the error rate of the data signal.

10. The communication system according to claim 9, wherein:
the second communication device includes a third transmitter configured to convert the data signal into an optical signal, and
the first communication device includes a third receiver configured to receive the optical signal and to generate the data signal based on the optical signal.

11. The communication system according to claim 9, wherein the first receiver comprises:

a third control signal generator configured to receive the first control signal and the second control signal, and to generate the level control signal.

12. The communication system according to claim 11, wherein the third control signal generator is configured to generate the level control signal by outputting the first control signal during a first time period, and the second control signal during a second time period subsequent to the first time period.

13. The communication system according to claim 11, wherein the third control signal generator is configured to generate the level control signal by outputting a high order bit of the first control signal and a low order bit of the second control signal.

14. The communication system according to claim 9, wherein the first receiver further comprises:
at least one error correction decoder respectively configured to determine a number of errors in the data signal, wherein the second control signal generator is configured to generate the second control signal based on the determined number of errors in the data signal.

15. The communication system according to claim 9, further comprising:
a transmission cable connected between the first communication device and the second communication device, wherein the transmission cable includes an optical fiber and an electric wire.

16. The communication system according to claim 15, further comprising:
a coupling detector configured to determine a connection state of the transmission cable.

17. A communication method comprising:
receiving, at a first communication device, a data signal from a second communication device;
generating, by the first communication device, a level control signal based on an initial level of the data signal and on an error rate of the data signal, including:
generating a first control signal based on the initial level of the data signal, and
generating a second control signal based on the error rate of the data signal;
transmitting, from the first communication device to the second communication device, the level control signal; and
generating, by the second communication device, the data signal based on the level control signal.

18. The communication method according to claim 17, wherein the receiving and transmitting is performed using a transmission cable connected between the first communication device and the second communication device, wherein the transmission cable includes an optical fiber and an electric wire.

* * * * *